Jan. 20, 1948. J. W. WARREN 2,434,876
COWL FASTENER
Filed Jan. 15, 1944
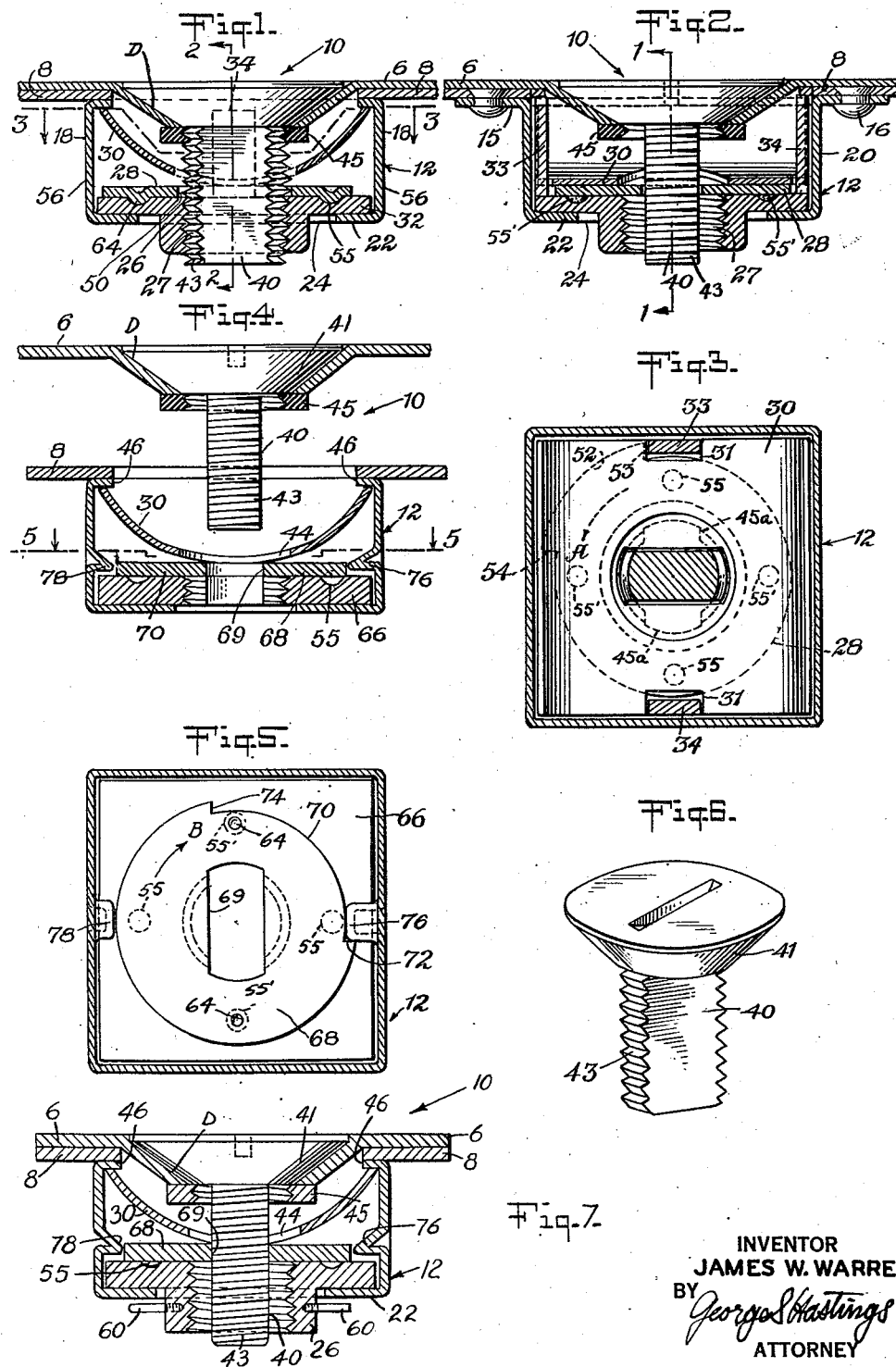
INVENTOR
JAMES W. WARREN
BY George S. Hastings
ATTORNEY Patented Jan. 20, 1948

2,434,876

UNITED STATES PATENT OFFICE 2,434,876

COWL FASTENER

James W. Warren, Lynbrook, N. Y., assignor to American Machine and Foundry Company, a corporation of New Jersey Application January 15, 1944, Serial No. 518,332

14 Claims. (Cl. 24—221)

This invention relates to fastening devices and more particularly to cowl fasteners of a universal type in which the same fastener can be employed for securing together plates of varying thicknesses and thus eliminate the necessity of maintaining in stock a plurality of varying sizes of locking studs for accomplishing the desired result.

In the past it has been customary to use cowl fasteners and employ in conjunction therewith locking studs of varying lengths or shims under the receptacle in order to meet the requirements of a particular locking problem so that if the cowl or other plates being secured together detachably varied in thickness it would necessitate the use of a longer or shorter stud, or varying thickness of shims in order to secure the plates together satisfactorily.

It is an object of my invention, therefore, to provide an improved universal type fastener in which the same fastener and locking studs can be employed to secure together detachable plates of varying thicknesses.

It is a further object of my invention to provide an improved cowl fastener employing a locking stud having an interrupted thread and means for securing the stud in one of the plates to be held together in such a way that the same stud can be employed over a wide range of locking conditions including variations in plate thickness.

It is a further object of my invention to provide an improved fastener suitable for use in securing a plurality of plates together such as cowl plates of an airplane which is readily adaptable for use in plates of varying thickness.

It is also an object of my invention to provide a universal fastener which is designed to satisfy all requirements to which it may be subjected, such as load capacities, plate separation and positive locking and unlocking.

It is a further object of my invention to provide an improved universal fastener having positive means for limiting plate separation when the several parts of the fastener are in locking cooperation.

It is an added object of my invention to provide an improved universal fastener having a turnable locking member provided with means for limiting its movement into and out of locking position.

It is also an object of my invention to provide an improved fastener which satisfies all requirements to which it may be put and at the same time reduce the fastener weight to a minimum.

My invention also consists in a fastener device having improved means for securing the locking element in assembled relationship in one plate for locking engagement with another portion of the device in another plate to be secured together and eliminate the need for grommeting or use of a snap ring to secure the locking stud in its supporting plate.

A further object of my invention is to provide a fastening unit which employs a locking stud having an interrupted thread or screw such that a stud of a given length can be employed for locking together plates of varying thickness and to utilize a stud holding member, such as a fiber washer, to secure the stud in the stud supporting plate regardless of the thickness of the stud supporting plate, which minimizes the overall heighth of the fastener and accordingly reduces its weight.

With these and other objects not specifically mentioned in view, the invention consists in certain combinations and constructions which will be hereinafter fully described and then set forth in the claims hereunto appended.

In the accompanying drawings which form a part of this specification, and in which like characters of reference indicate the same or like parts:

Figure 1 is a sectional view of a preferred form of the invention taken on line 1—1 of Figure 2;

Figure 2 is a sectional elevation of the fastener taken on line 2—2 of Figure 1;

Figure 3 is a view taken on line 3—3 of Figure 1;

Figure 4 is a sectional view of a modified view of the invention showing the arrangement of the locking members with the locking stud separated therefrom;

Figure 5 is a sectional view taken on line 5—5 of Figure 4;

Figure 6 is a perspective view of the locking stud; and

Figure 7 is a partial sectional view showing a modified form of the invention with means for insuring against unlimited plate separation when the fastener is locked.

Referring to the drawings which show an embodiment of the invention selected for purposes of illustration, it will be seen that plates 6 and 8, which may be parts of an airplane cowling or other machine part, are held together by means of a fastener unit designated generally 10. This fastener unit consists of a receptacle indicated generally 12 provided at its ends with legs 15 and fixed to plate 8 by any suitable means such as rivets 16.

Receptacle 12 can be made in any desirable shape or size according to the demands and use to which the fastener is put, such as square or rectangular. In the form selected for purposes of illustration the fastener unit 10 is shown substantially square. The receptacle 12 is formed with side walls 18 and end walls 20, the latter terminating in the legs 15. Receptacle 12 is also provided with an inturned flange 22 provided with an opening 24 through which projects nut 26 seated within the receptacle 12.

As shown in Figures 1, 2 and 3, receptacle 12 houses nut 26, detent plate 28 and spring 30 and maintains the same in assembled operative relationship.

Nut 26 may be provided with a flange or plate 32 shaped to conform generally with the interior of the receptacle 12 in which the nut 26 is seated. As illustrated, flange 32 is of a size which permits slight lateral and longitudinal movement within receptacle 12 so that the nut can be shifted relative to the casing for introduction of the locking stud 40 either on or off center with respect to the dimple D in the stud supporting plate 6. Opening 24 is greater than the diameter of nut 26 so that the latter can slide on its seat relative to the side and end walls of the receptacle 12.

Flange or nut plate 32 is also provided with two upstanding lugs 33, 34 located on opposite edges, as shown in Figures 2 and 3. These lugs may be formed in any suitable manner such as ears on flange 32 which are bent up at substantially 90°. Lugs 33, 34 assist in positive locking of the members of the fastener unit, especially detent plate 28, described hereinafter, and may also serve as means for limiting separation of plates 6 and 8 when they are subjected to load.

Also included within receptacle 12 is a suitable spring for holding the several parts of the unit in the receptacle 12 in proper arrangement and locking relationship. In the embodiment shown, the spring may consists of a bowed flat steel member 30 provided with an opening 44 through which locking stud 40 can be inserted through slotted portions 45a in nut 26 and then turned through a predetermined arc, such as 90°, engaging the threads 27 of nut 26. Spring 30 is positioned is receptacle 12 with its two ends engaging ears 46 which are formed on receptacle 12 and act to locate spring 30 in proper position therein. Cut out portions 31 (Figure 3) may also be formed in spring 30 to allow clearance for lugs 33, 34 on nut plate 32. The middle portion of spring 30, as indicated in Figure 1, bears against detent or locking plate 28 provided with an opening 50 shaped generally to conform with the cross-section of locking stud 40 and thereby allow the passage of locking stud 40 therethrough into nut 26 and at the same time insure that when the locking stud is turned the detent or locking plate 28 also will be turned. Detent plate 28 preferably is provided with means for limiting its turning movement relative to the receptacle 12. This arrangement is designed to limit turning movement of plate 28 from either locking or unlocking position. A suitable means for carrying out this purpose may consist of a projecting stop segment 52 (Figure 3) formed on the edge of plate 28 having its end faces 53, 54 lying in planes substantially at right angles with each other. Plate 28 is provided with detents 64 adapted to move in and out of recesses 55 in nut flange 32 depending upon whether the locking stud 40 and detent plate 28 are in locking or unlocking position. Any suitable number of detents and recesses may be employed. Two detents spaced 180° apart on the detent plate 28 coacting with four recesses in nut flange 32 have been found satisfactory. In this way plate 28 is held against turning both in locking and unlocking positions.

It will be seen that the plate stop 52 is so designed that when detent plate 28 is moved by locking stud 40 through 90° from unlocking to locking position, face 53 will engage lug 33 on the nut plate, at substantially the same time that a detent 64 on detent plate 28 clicks into a recess 55 formed in nut plate 32. In this way the person operating the fastener is apprised audibly that the several parts are in locking engagement, and because of the engagement of face or abutment 53 of stop segment 52 with lug 33, overtravel of plate 28 and undesired unlocking is prevented.

Locking stud 40 preferably is provided with a tapered head 41 and an interrupted thread. In the form shown, stud 40 is adapted to fit in a dimple D formed in plate 6 so that when in locking position it will lie substantially flush with the surface of plate 6. Stud 40 may be secured in plate 6 by any conventional means such as grommets or snap rings. I prefer, however, to continue the threads 43 into close adjacency with head 41 and employ a friction ring, such as a fiber or plastic washer 45, which when applied to the shank of the stud forms its own thread as it is screwed on the threads 43 up against the under side of the dimple on plate 6 to hold the stud properly positioned therein. In this manner the same stud can be used regardless of variations in the thicknesses of the plates because only the position of the washer on the shank of the locking stud will vary in accordance with plate thickness. This condition holds true within a wide range depending upon the size of fastener unit employed for a particular job.

It has been found desirable to provide means for limiting plate separation during actual use of machines employing fasteners of the type under consideration. As an example, certain army and navy specifications limit the separation of plates to say 3/64 of an inch. One means for meeting this requirement is to form lugs 33, 34 of such length that the maximum distance at all times between the top of the lugs and plate 8 when locking stud 40 is in locking engagement with nut 26 shall be not in excess of 3/64 of an inch. Obviously the distance can be varied in accordance with specifications insofar as length of lugs 33, 34 is concerned.

Plate separation can also be controlled by inserting one or more pins 60 in nut 26 (as shown in Figure 7) and at a position such that that portion of the pins nearest receptacle flanges 22 will limit movement of the nut plate 32 away from flange 22 to 3/64 of an inch or any other desired distance according to the position occupied by the pins.

A modified form of the invention embraces the same general principles of the preferred form described hereinabove. As shown in Figures 4 and 5, nut 66 is contained within receptacle 12, and is of such a size that it may have relative lateral movement therein in order to make possible easy alignment with locking stud 40, if for any reason the stud and nut are not in perfect alignment.

Nut 66 may vary in thickness according to the demands to which the fastener is put, and requirements of specifications. In any case, nut 66 is of a thickness sufficient to hold a stud 40 locked firmly therein.

A locking or detent plate 68 is located between nut 66 and spring 30. This plate may also be provided with locking detents 64 adapted to coact with recesses 55 formed in nut 66. Plate 68 is also provided with an opening 69 conforming generally with the cross section of stud 40 so that when the latter is turned, plate 68 is also turned and detents 64 move into locking engagement with recesses 55.

In order to prevent overtravel of plate 68 in moving either from locking or unlocking position, plate 68 is provided with a cut out portion 70 extending along the periphery thereof, and having faces 72, 74 which engage shoulder 76 on an inner face of the receptable 12. As shown in Figure 5, the fastener elements are in unlocking positions, and face 72 bears against shoulder 76. When stud 40 and plate 68 are moved in the direction of the arrow B until face 74 engages shoulder 76, detents 64 are moved out of recesses 55 and into recesses 55' causing an audible click. In this manner the fastener will be locked and so that plates 6, 8 cannot be separated.

In order to insure against anything but an allowed and limited plate separation, a second lug or shoulder 78 is fixed to or formed in the wall of receptacle 12. The under faces of lugs 76, 78 are spaced say 3/64 of an inch or suitable distance from the top of nut 66 when the fastener parts are locked together. The distance from the faces of lugs 76, 78 to the top surface of nut 66 can be varied to meet specifications.

Referring to Figures 1, 2 and 3, a brief description of the operation of the fastening unit (shown therein) is as follows, assuming that receptacle 12 and its enclosed elements are fastened by any suitable conventional means, such as rivets 16 to plate 8 and locking stud 40 is secured by washer 45 in plate 6. Plate 6 and locking stud 40 are superimposed in proper relation with respect to the opening through spring 30, detent plate 28 and nut 26. The two plates are associated in locking relation, locking stud 40 is now located so that the proper threads 43 thereof will engage with threads 27 of nut 26 when the stud is turned through 90° by any suitable means such as a screw driver or other tool (not shown). Detent plate 28, which is positioned resiliently against nut flange 32 by spring 30, is turned simultaneously with the stud 40 until face 53 of stop 52 engages upstanding lug 33 of nut flange 32 and at the same time an audible click can be heard as detents 64 on plate 28 move into engagement with recesses 55 in nut flange 32.

Locking association between the several parts above described will continue until stud 40 is turned in a reverse direction to remove the detents 64 from engagement with recesses 55 and cause face 53 of stop 52 to move out of engagement with lug 33. Stud 40 and plate 28 are turned in the direction of the arrow A (Figure 3) until face 54 of stop 52 engages lug 34 at which time detents 64 click into the other set of recesses 55'. This arrangement permits positive positioning of the fastener parts in unlocked relationship.

The invention above described may be varied in construction within the scope of the claims, for the particular device selected to illustrate the invention, is but one of many possible concrete embodiments of the same. It is not, therefore, to be restricted to the precise details of the structure shown and described.

What is claimed is:

1. A fastener device of the type adapted to secure plates together detachably, comprising a receptacle and means for securing said receptacle to one of said plates, a nut loosely mounted within said receptacle, a locking plate provided with a stud receiving opening mounted within said receptacle and in engagement with said nut, a resilient locking element positioned within said receptacle and constructed and arranged to bias said plate into engagement with said nut, a locking stud adapted to be inserted through another of said plates and through said member and plate into engagement with said nut, the cross-section of said stud conforming substantially with the shape of said opening in said locking plate, means on said plate for effecting locking cooperation between said stud, plate and nut when said stud and plate are turned relative to said receptacle, means for limiting the turning movement of said stud and plate, said means including a flange formed on the edge of said locking plate, and means on said nut engaged by said flange for preventing turning movement of said stud.

2. A fastener device for use in securing together a plurality of plates comprising a receptacle, a nut mounted within said receptacle for lateral shifting movement relative thereto, means on said nut preventing rotation thereof in said receptacle, a turnable locking plate, a spring located in said receptacle and constructed and arranged to urge said plate against said nut, a locking stud having an interrupted thread adapted to be inserted through said spring and plate for engagement with said nut, said plate and nut having openings conforming substantially with the cross-section of said stud, means on said plate and operative when said plate has been turned by said stud for securing said stud in locked position in said nut relative to said receptacle, means on said plate limiting turning movement of said plate and stud into locking position, and means for limiting axial movement of said stud when in locking position to control the separation of said plates and maintain the same at a minimum.

3. A fastener device comprising a receptacle, a flanged nut mounted in said receptacle and projecting outwardly therefrom through an opening in said receptacle, angular lugs on said flange of said nut, a locking plate, a spring within said receptacle pressing said plate against said flange, a locking stud adapted to be inserted through said spring, and plate for engagement with the threads of said nut, and a projection on the edge of said plate constructed and arranged to engage one of said lugs to prevent further turning movement of said stud and plate relative to said flange when said stud and plate have been moved to locking position.

4. A fastener device for use in securing together detachably a plurality of separable plates of any thickness, comprising a receptacle, a flanged nut mounted in said receptacle and projecting outwardly therefrom through an opening in said receptacle, angular lugs on said flange of said nut, a locking plate, a spring within said receptacle pressing said plate against said flange, a locking stud adapted to be inserted through said spring, and plate for engagement with the threads of said nut, a projection on the edge of said plate constructed and arranged to engage one of said lugs to prevent further turning movement of said stud and plate relative to said flange when said stud and plate have been moved to locking position, and means for insuring minimum separation of said plates when locked together.

5. A fastener device for holding a plurality of members together comprising a receptacle, a flanged nut mounted in said receptacle and projecting outwardly therefrom through an opening in said receptacle, angular lugs on said flange of said nut, a locking plate, a spring within said receptacle pressing said plate against said flange, a locking stud adapted to be inserted through openings in said spring and plate for engagement with the threads of said nut, and a projection on the edge of said plate constructed and arranged to engage one of said lugs to prevent further turning movement of said stud and plate relative to said flange when said stud and plate have been moved to locking position, said lugs being constructed and arranged to engage one of said members and limit member separation to a minimum when said members are locked together.

6. A fastener device of the type adapted to secure plates together detachably, comprising a receptacle and means for securing said receptacle to one of said plates, a nut carried by said receptacle, a locking plate provided with a stud receiving opening mounted within said receptacle and in engagement with said nut, a resilient locking element positioned within said receptacle and constructed and arranged to bias said plate into engagement with said nut, a locking stud adapted to be inserted through another of said plates and through said member and plate into engagement with said nut, the cross-section of said stud conforming substantially with the shape of said opening in said locking plate, means on said plate for effecting locking cooperation between said stud, plate and nut when said stud and plate are turned relative to said receptacle, means for limiting the turning movement of said stud and plate, and means for limiting axial movement of said stud when in locking cooperation with said plates and nut.

7. A fastener device of the type adapted to secure plates together detachably, comprising a receptacle and means for securing said receptacle to one of said plates, a nut loosely mounted within said receptacle and provided with a recess, a locking plate provided with a stud receiving opening mounted within said receptacle and in engagement with said nut, a locking stud adapted to be inserted through another of said plates and through said member and locking plate into engagement with said nut, the cross-section of said stud conforming substantially with the shape of said opening in said locking plate, means on said locking plate adapted to engage said nut for effecting locking cooperation between said stud and locking plate when turned relative to said receptacle, means for limiting the turning movement of said stud and locking plate, and means on said receptacle for limiting axial movement of said stud when in locking cooperation with said plates and nut.

8. A fastener device for use in securing together a plurality of members comprising a receptacle, a nut carried by said receptacle, a turnable locking plate in said receptacle, a spring located in said receptacle and constructed and arranged to urge said plate against said nut, a locking stud having an interrupted thread adapted to be inserted through said spring and plate for engagement with said nut, said locking plate and nut having openings conforming substantially with the cross-section of said stud, means on said locking plate and operative when said locking plate has been turned by said stud for securing said stud in locked position in said nut relative to said receptacle for securing said members together, means on said locking plate limiting turning movement of said locking plate and stud into locking position, and means on said nut positioned exteriorly of said receptacle for limiting separation of said members when secured together.

9. A fastener device for use in detachably securing together a plurality of separable members, comprising a receptacle, a nut carried by said receptacle, said nut being furnished with recesses, a locking stud having an interrupted thread, means for securing said stud for turning movement in one of said members, a locking plate located in said receptacle, locking detents on said plate constructed and arranged to coact with said recesses, said stud and said nut being provided with openings conforming substantially in shape to the cross-section of said stud, a bowed flat spring secured within said housing and pressing said plate against said nut, said spring having an opening through which said stud may be inserted, and means on said plate for limiting the turning movement of said stud and plate when said detents are in locking engagement with said recesses, said last named means consisting of an abutment formed on the edge of said locking plate.

10. A fastener device of the type adapted to secure separable members together detachably, comprising a receptacle and means for securing said receptacle to one of said members, a nut loosely mounted within said receptacle, a locking plate provided with a stud receiving opening mounted within said receptacle and in engagement with said nut, a resilient locking element positioned within said receptacle and constructed and arranged to bias said locking plate into engagement with said nut, a locking stud adapted to be inserted through another of said members and through said element and locking plate into engagement with said nut, the cross-section of said stud conforming substantially with the shape of said opening in said locking plate, means on said locking plate for effecting locking cooperation between said stud, locking plate and nut when said stud and locking plate are turned relative to said receptacle, said last-named means producing an audible click when moving into or out of locking engagement with said nut, the periphery of said locking plate being cut away for a portion thereof to provide an abutment at an end of said cut away portion, and means positioned for engagement by said abutment for limiting the turning movement of said stud and locking plate.

11. A fastener device for use in securing togeth a plurality of plates comprising a receptacle, a nut mounted within said receptacle, a turnable substantially circular locking plate, a spring located in said receptacle and constructed and arranged to urge said locking plate against said nut, a locking stud having an interrupted thread adapted to be inserted through said spring and locking plate for engagement with said nut, said locking plate and nut having openings conforming substantially with the cross-section of said stud, means on said locking plate and operative when said locking plate has been turned by said stud for securing said stud in locked position in said nut, the periphery of said plate being cut away for a portion thereof to provide an abutment for limiting turning movement of said plate and stud into locking position, and a second abutment also formed on the periphery of said plate for limiting turning movement of said plate and stud into unlocking position.

12. A fastener device of the type adapted to secure plates together detachably, comprising a receptacle and means for securing said receptacle to one of said plates, a nut carried by said receptacle and provided with a plurality of sets of recesses, a locking plate provided with a stud receiving opening also carried by said receptacle and in engagement with said nut, a locking stud adapted to be inserted through another of said plates and through said member and locking plate into engagement with said nut, detent means on said locking plate adapted to engage one of said sets of recesses for effecting locking cooperation between said stud and locking plate when turned relative to said receptacle, and to engage another set of recesses in said nut when said stud and locking plate are turned in the opposite direction to unlocking position, an abutment on the peripheral edge portion of said locking plate for limiting the turning movement of said stud and locking plate into locking position, and a second abutment formed on said peripheral edge portion of said locking plate for limiting the turning movement of said stud and locking plate into unlocking position.

13. A fastener device comprising a receptacle, a nut carried by said receptacle, a turnable locking plate in said receptacle, said locking plate having a reduced peripheral portion with movement limiting faces, a spring within said receptacle pressing said locking plate against said nut, a locking stud adapted to be inserted through said spring and locking plate for engagement with the threads of said nut, projections on said receptacle extending into the path of movement of said locking plate to limit the movement thereof in either direction when said locking plate is turned with said stud to lock or unlock said nut and locking plate.

14. A fastener device comprising a receptacle, a nut carried by said receptacle and provided with locking recesses, a turnable locking plate in said receptacle, said locking plate having a reduced peripheral portion with movement limiting faces, a spring within said receptacle pressing said locking plate against said nut, detents on said locking plate, a locking stud adapted to be inserted through said spring and locking plate for engagement with the threads of said nut, projections on said receptacle extending into the path of movement of said locking plate to limit the movement thereof when said locking plate is turned with said stud to engage said detents in said recesses, said projections being spaced from said nut to prevent excess axial movement of said stud when said stud and nut are locked together.

JAMES W. WARREN.

REFERENCES CITED

The following references are of record in the file of this patent:

UNITED STATES PATENTS

| Number | Name | Date |
|---|---|---|
| 2,323,260 | Venditty | June 29, 1943 |